(12) United States Patent
Quinlan et al.

(10) Patent No.: US 6,275,880 B1
(45) Date of Patent: Aug. 14, 2001

(54) FRAMING CODES FOR HIGH-SPEED PARALLEL DATA BUSES

(75) Inventors: Una Quinlan; Con Cremin; Eugene O'Neill, all of Dublin; J. Noel Butler, Galway; Mark A. Hughes, Dublin; Neil O. Fanning, County Cork, all of (IE)

(73) Assignee: 3Com Technologies, Grand Cayman, KY (US)

( * ) Notice: Subject to any disclaimer, the term of this patent is extended or adjusted under 35 U.S.C. 154(b) by 0 days.

(21) Appl. No.: 09/253,537

(22) Filed: Feb. 22, 1999

(30) Foreign Application Priority Data

Oct. 22, 1998 (GB) .................................................. 9823004

(51) Int. Cl.⁷ ...................................................... G06F 13/00
(52) U.S. Cl. ......................... 710/100; 707/100; 707/101; 707/102; 707/103; 707/104; 341/50; 341/55; 341/67; 341/106
(58) Field of Search ............................ 710/100; 707/100, 707/101, 102, 103, 104; 341/50, 55, 67, 106

(56) References Cited

U.S. PATENT DOCUMENTS 5,313,203 * 5/1994 Suu et al. ................................ 341/50
5,999,934 * 12/1999 Cohen et al. ......................... 707/100

FOREIGN PATENT DOCUMENTS 2 336 074   10/1999  (GB) .
2 336 075   10/1999  (GB) .
2343092A  * 4/2000  (GB) .

* cited by examiner

Primary Examiner—Rupal Dharia
(74) Attorney, Agent, or Firm—Nixon & Vanderhye P.C.

(57) ABSTRACT

A plurality of serial data streams are transmitted on a corresponding plurality of lines at a common frequency in equal groups of symbols. A framing signal composed of groups of symbols corresponding in number to groups of data symbols is transmitted on an additional control line. Each group of symbols in the framing signal includes a majority of symbols capable of representing a first plurality of code words and a second plurality, substantially less than the first plurality, of valid code words, and a minority of symbols which constitute parity check symbols. Each of the valid code words consists of a first sub-group of similar symbols and a second plurality of similar symbols. For some of the valid code words the symbols in the first sub-group are similar to the symbols in the second sub-group. For other valid code words the symbols in the first sub-group are different from the symbols in the second sub-group. The valid code words correspond to groups which represent (a) start of a data packet or block; (b) data/(c) a gap between groups of data; and (d) an idle state. The sequence of groups in the framing signal is monitored by means of a state machine.

7 Claims, 3 Drawing Sheets

FRAMING CODES FOR HIGH-SPEED PARALLEL DATA BUSES

CROSS-REFERENCE TO RELATED APPLICATIONS

This application is related to the following U.S. Applications Cremin et al, Ser. No. 09/196215 filed Nov. 20, 1998 abandoned; and Cremin et al, Ser. No. 09/196216 filed Nov. 20, 1998 abandoned.

INTRODUCTION TO THE INVENTION

The present invention relates to the transmission of data, for example from one network device to another, over a link, which may be of substantial length, in a multiplicity of parallel lines. The invention is particularly, although not necessarily exclusively, intended for use in systems where the data rate is very high, for example substantially in excess of one hundred megabits per second.

BACKGROUND TO THE INVENTION

The present invention is particularly intended for use in a system wherein data is conveyed in a multiplicity, such as eight, serial data streams on corresponding parallel lines so that the data lines constitute a synchronous parallel bus. For example, such a parallel bus may be employed for the transmission of data from one device or 'chip' to another, a relatively wide parallel signal being converted group by group into corresponding serial groups which are transmitted on the respective lines of the synchronous parallel bus. In a particular example, the parallel digital signal may be sixty-four bits wide and each eight-bit group (i.e. byte) in the digital signal may be serialised and transmitted along a respective one of the lines of the parallel bus. At the receiver, or destination 'chip', the serial groups may be deserialised to reconstitute the data signal in its original wide parallel form.

Systems of this nature, and intended to deal with the problems of phase shift and byte alignment, are the subject of the above-mentioned earlier patent applications which are commonly assigned and are incorporated herein by reference.

High-speed serial links normally employ framing codes with redundancy, such as schemes known as 8B/10B, and also include cyclic redundancy codes for the detection of transmission errors. The main disadvantages of these schemes are the substantial transmission capacity (i.e. bandwidth) that they require. Furthermore, the complexities of implementing redundant encoders at very high operating frequencies are substantial.

The present invention is based on the use of an additional line, herein called a 'control line', in parallel with the high-speed parallel bus. Such a control line has a general utility, for example for the transmission of training patterns which may be employed, as suggested in the earlier applications, to maintain the data lines in synchronism. The object of the present invention is to provide framing codes on such a control line in a manner which employs a high degree of redundancy to provide error detection and preferably includes a parity check, so that coding redundancy or cyclic redundancy code protection in the data signal is not required, the corresponding bandwidth being saved.

BRIEF SUMMARY OF THE INVENTION

Broadly, the invention resides in a method of transmitting data wherein serial data streams are transmitted on parallel lines at a common frequency, in groups of symbols, and a framing signal is transmitted on an additional parallel line, the framing signal being composed of groups of symbols corresponding to the groups of data symbols, each group of the framing signal comprising a majority of symbols capable of representing a first plurality of code words of which only a second plurality, very much smaller than the first plurality, are defined valid code words, and a minority of symbols indicating a parity check.

The serial data streams may be obtained by the conversion of a parallel digital signal into a plurality of serial signals wherein each group of symbols in each serial signal corresponds to a group of symbols in the parallel digital signal.

Preferably, each valid code word in a group of symbols in the framing signal consists of a first sub-group of similar symbols and a second sub-group of similar symbols. Such a particular choice enables the provision of four valid sub-codes, according as the sub-groups of symbols are similar or different. In any event, the number of possible codes is an exponential function of the number of symbols in the two sub-groups and will be much greater than the valid code words. In a particular example, wherein each group of symbols consists of eight binary digits, the framing code words consist of two groups of three digits and there are only four valid code words out of the sixty-four possible code words which may be made from the six digits.

A minority, in a specific example two symbols out of eight, of the symbols of the framing codes may be used to provide a parity check. This parity check may be generated from the data groups but may also be generated from the data groups and the framing codes words.

Preferably, the valid code words each correspond to a specified state of the data groups, and in particular they represent the start of a data block (i.e. packet), valid data, a gap between data groups and an idle state. For valid transmission of data, these groups must occur in a valid sequence and accordingly a state machine organized in accordance with the sequence may be arranged in the receiver to track the sequence and to detect illegal sequences without requiring the intervention of a central processing unit.

Further features and advantages of the invention will become apparent from the following detailed description of a specific example.

DETAILED DESCRIPTION

Figure 1:
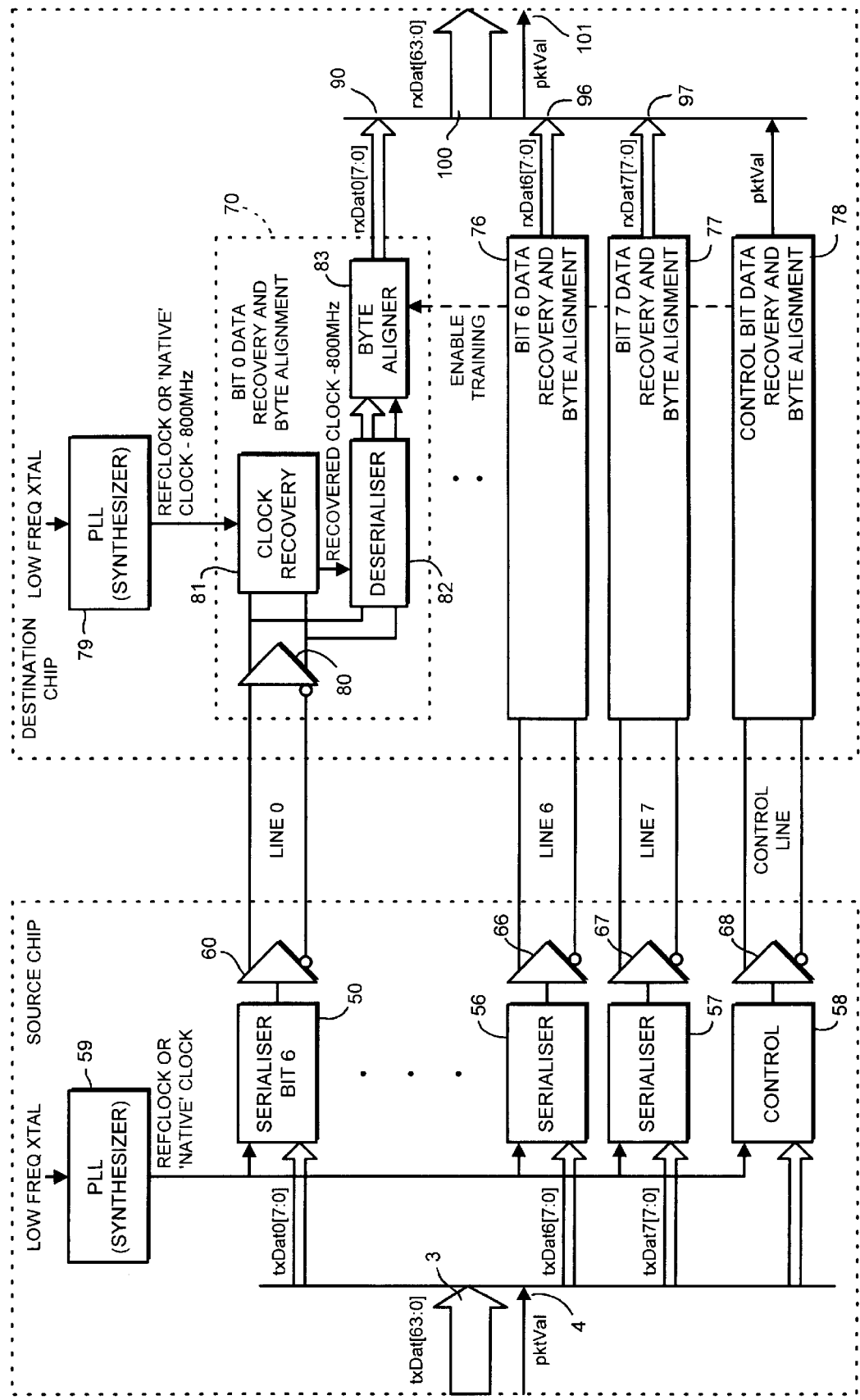
FIG. 1 illustrates a high-speed parallel data link.

FIG. 1 of the drawings illustrates by way of example a system comprising a first network device, preferably constituted by a first 'chip' and called herein a transmitter 1, which receives data in, in this example, sixty-four-bit wide parallel form and is arranged to convert such data into a plurality of bit streams (eight in this example) which are transmitted over respective lines to a receiver 2.

The transmitter and receiver shown in FIG. 1 generally correspond to the transmitter and receiver shown in the aforementioned earlier patent application Ser. No. 09/196216 as previously mentioned. However, the same transmitter may be used with a different receiver, such as that disclosed in the aforementioned patent application Ser. No. 09/196215. In essence the difference between the systems described lies in the manner in which a clock signal is reconstituted and used to provide phase alignment in the receiver.

In the system shown, sixty-four-bit wide parallel data is received on a bus 3 together with a 'packet valid' signal on an associated control line 4. Each group of symbols, in this example each group of eight bits, is received by a respective serialiser 50 to 57, of which only three are shown. These serialisers are, together with a control bit transmitter 58, under common clock control by a phase-locked loop synthesizer 59. This synthesizer generates from a local stable comparatively low frequency clock signal a high frequency clock to enable the serialisers to transmit symbols at a corresponding frequency. The serial streams are driven onto the lines of the parallel bus by way of differential low voltage drivers 60 to 68.

The receiver is coupled to receive data from the lines 50 to 58 and comprises a corresponding number of data recovery blocks 70 to 78, one for each data line and one for the control line. The data recovery blocks are under the common clock control of a phase-locked loop synthesizer 79 which from a local stable low frequency clock generates a high frequency reference clock.

The data recovery blocks are generally similar and only the data recovery block 70 need be described. It includes a differential buffer amplifier 80 which is coupled to the line 60 and drives both a clock recovery circuit 81 and a deserialiser 82. The clock recovery circuit 81 is clock controlled from the synthesizer 79 and shifts the phase of the clock to align it to the phase of the incoming bit. The phase shifted clock is fed to the deserialiser 82, which converts a group (in this example eight) of incoming bits into parallel form so as to provide a respective output on an eight-bit parallel bus 90. A deserialiser for this purpose is described in the aforementioned application Ser. No. 09/196215. The deserialised data is fed to a byte line 83, the function of which is to select which of the deserialised bits is the first bit of a pattern so as to achieve byte alignment. The data recovery blocks 71 to 77 provide similarly formatted data on the output lines 91 to 97 and the parallel data is output along with the data valid signal on an output bus 100 and a control line 101 respectively. The control data is recovered by means of a data recovery block 78 similar to the block 70 to 77.

As thus far described, the system corresponds to that described in the earlier application. The present invention utilizes the control line to transmit a framing signal which exhibits a high degree of redundancy of invalid codes and includes a minority of parity check symbols, so that framing errors and also individual symbol errors can be detected without requiring unnecessary processing or the occupation of excessive bandwidth.

Each group of a framing signal needs initial transmission in synchronism with the respective groups transmitted over the parallel data lines. This is easily accomplished by the synchronous control exerted by the common phase-locked loop 59 controlling the control circuit 58 as well as the serialisers 50 to 57.

As previously indicated, each group of symbols in the framing signal consists of a majority of symbols which are capable of representing a first plurality of code words but are defined to constitute only a small number of valid code words. In a specific example, each framing code consists of six bits, the remaining two bits in each group of eight symbols representing a parity check, which may be generated from the respective parallel data word in accordance with known parity check generation techniques.

The six bits in the framing codes can provide a maximum of sixty-four codes but in this example only four of these codes are valid codes. They are preferably represented by a first sub-group of similar symbols and a second sub-group of similar symbols. Each sub-group in this specific example consists of three symbols and the valid codes are provided according as the symbols in the first group are different from those in the second sub-group.

Thus in a preferred example, the four valid framing codes are (a) 111-111; (b) 000-111; (c) 111-000; and (d) 000-000.

It may be seen that these valid codes have a Hamming distance of three, at least three bit errors being required for one code to be interpreted as another.

Further, the four codes indicated above, preferably indicate the start of packet (SOP), a subsequent group of data (VALID), a gap between data (GAP) and an idle state (IDLE). Since these states of the data necessarily occur in predetermined sequences, a state machine may be included in the recovery block 78 of FIG. 1 in order to detect illegal sequences and to generate error indications.

Figure 2:
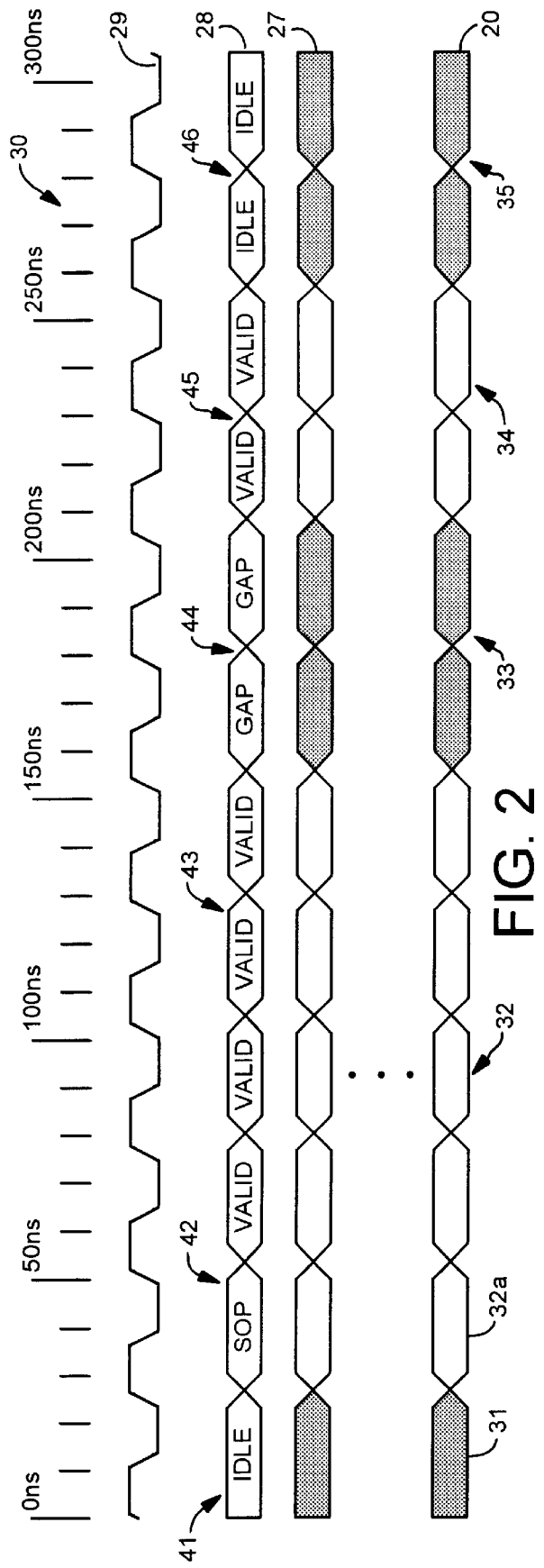
FIG. 2 illustrates signals including framing signals, occurring at various parts of the system shown in FIG. 1.

FIG. 2 illustrates the relationship between the groups of the framing signal and the groups of data.

In FIG. 2, the lines 20 and 27 represent the first and eighth data lines along which the groups of data are transmitted serially and in desired synchronism. Referring to the data signal 20, the first group shown is an idle group 31, which is followed in this example by five groups of data symbols 32. Of these, the first group 32a is presumed to be the first group in a data block or packet.

The five data groups are followed by two groups 33 representing a gap between successions of data groups, and are followed by two further data groups 34, and then a succession of groups 35 of the idle state.

Correspondingly therefore, the framing signal has groups of signals which represent the relationship of the groups of data to the correct framing of the data signals. Thus the first group 41 shown for the framing signal 28 should include the 'IDLE' framing code, the second group 42 should include the 'SOP' code, the next four groups 43 should include the 'VALID' code, the next two groups 44 should include the 'GAP' code, the next two groups 45 should include the 'VALID' code and the subsequent groups 46 should include the 'IDLE' code.

If these groups are detected out of proper sequence by the state machine, an error indication will be produced.

FIG. 2 also illustrates a clock signal 29 and a timing frame 30.

Figure 3:
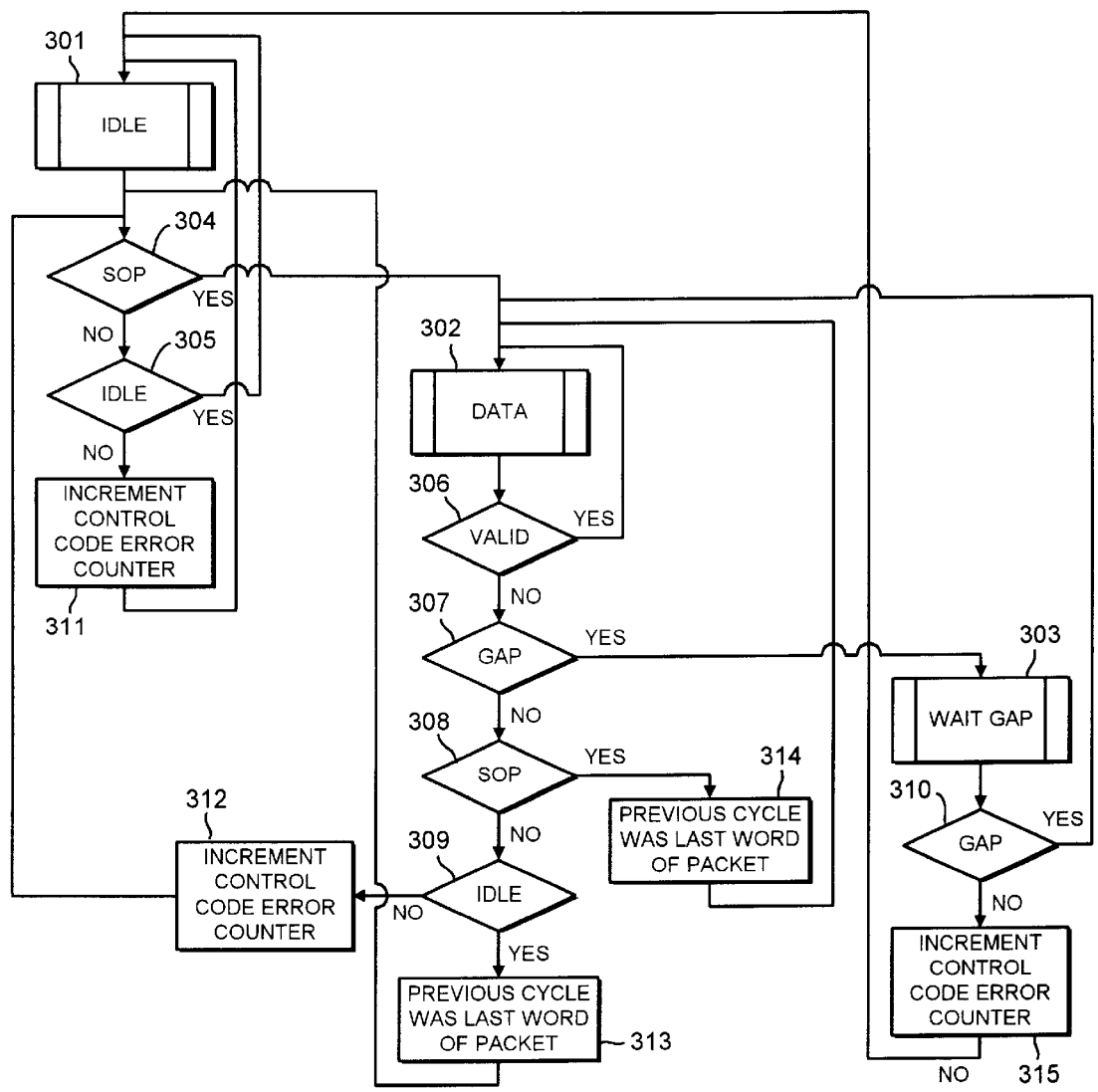
FIG. 3 illustrates a state machine.

FIG. 3 illustrates a state machine which may be included in the data recovery circuit 78 in order to detect illegal sequences in the framing group sequence.

The state machine has three nodal states: state 301, representing the 'IDLE' state, state 302, representing the 'DATA' state, and state 303, representing the 'WAIT GAP' state. As is usual for state machines, the machine relies on an examination of each successive framing code for a decision whether to execute a transition between states.

It is initially presumed that the machine is in the 'IDLE' state 301. The stages 304 to 310 represent interrogations performed on the framing code.

Thus, if the state machine is in the 'IDLE' state, state 301, and the next framing code is the 'SOP' code, stage 304, the state machine executes the transition to the 'DATA' state 302.

If the first group is not a 'SOP' code, stage 305 tests for the 'IDLE' code. If the code is confirmed to be the 'IDLE' code, the state machine remains in the 'IDLE' state. If however the code is not the 'IDLE' code, the sequence is in error because an 'IDLE' state can only be followed either by the 'SOP' code or the 'IDLE' code. The system increments a control count in an error counter, as shown by stage 311.

If the state machine is in the 'DATA' state 302, and the next framing code indicates valid data, stage 306, the state machine remains in the 'DATA' state, state 302. If the framing code is not the 'VALID' code but is the 'GAP' code, see stage 307, the state machine executes the transition into the 'WAIT GAP' state, state 303.

If the code is not the 'GAP' code but is detected to be the 'SOP' code, then the previous group was the last word in a packet, stage 314, and the machine remains in the 'DATA' state. If however the test at stage 308 indicates absence of 'SOP', there is a test for the 'IDLE' code, stage 309. If the 'IDLE' code test fails, the sequence is illegal and thus must be an increment in the control code error counter, see stage 312.

If in the sequence of tests for the transition from the 'DATA' state, the 'IDLE' state is detected, at stage 309, the previous cycle was the last word of a packet (stage 313) and accordingly a test must be made for a 'SOP' code, stage 304. Failure of this test requires a test for the 'IDLE' code, stage 305, whereas affirmation of the test at stage 304 will cause the machine to remain in the 'DATA' state, state 302.

Finally, if the machine has been put into the 'WAIT GAP' state, state 303, by an affirmative test at stage 307, it will make one test for the next code to be a 'GAP' code, stage 310. If the 'GAP' code is detected, the machine executes the transition to the 'DATA' state, because in the sequence under discussion the 'GAP' codes occur in pairs of successive codes. Obviously, if a 'GAP' code is not detected at stage 310, the code sequence is in error, the code control error counter is incremented as shown by stage 315 and the state machine returns to the 'IDLE' state.

Although, as previously indicated, the system described does not require the intervention of a central processor (CPU), a CPU may if desired poll the control error counter at desired intervals. Alternatively, the existence of a specific error count may be used to generate an interrupt for the CPU.

What is claimed is:

1. A method of transmitting data comprising:

transmitting a plurality of serial data streams on a corresponding plurality of lines at a common frequency, said data being transmitted in equal groups of symbols;

transmitting on an additional line a framing signal composed of groups of symbols corresponding in number to groups of data symbols;

wherein each group of symbols in the framing signal comprises a majority of symbols capable of representing a first plurality of code words and a second plurality, substantially less than the first plurality, of valid code words, and a minority of symbols which constitute parity check symbols.

2. A method of transmitting data comprising:

transmitting a plurality of serial data streams on a corresponding plurality of lines at a common frequency, said data being transmitted in equal groups of symbols; and transmitting on an additional line a framing signal composed of groups of symbols corresponding in number to groups of data symbols;

wherein each group of symbols in the framing signal comprises a majority of symbols capable of representing a first plurality of code words and a second plurality, substantially less than the first plurality, of valid code words, and a minority of symbols which constitute parity check symbols; and each of said valid code words consists of a first sub-group of similar symbols and a second plurality of similar symbols, wherein for some of said valid code words the symbols in the first sub-group are similar to the symbols in the second sub-group and for other valid code words the symbols in the first sub-group are different from the symbols in the second sub-group.

3. A method according to claim 2, wherein said valid code words correspond to groups which represent (a) start of a data packet or block; (b) data; (c) a gap between groups of data; and (d) an idle state.

4. A method of transmitting data comprising:

transmitting a plurality of serial data streams on a corresponding plurality of lines at a common frequency, said data being transmitted in equal groups of symbols; and transmitting on an additional line a framing signal composed of groups of symbols corresponding in number to groups of data symbols;

wherein each group of symbols in the framing signal comprises a majority of symbols capable of representing a first plurality of code words and a second plurality, substantially less than the first plurality, of valid code words, and a minority of symbols which constitute parity check symbols; and said method further comprising monitoring a sequence of groups in the framing signal by means of a state machine according to at least one valid sequence, and detecting errors when the state machine detects an illegal sequence.

5. A method according to claim 1, each of said valid code words comprising a first sub-group of similar symbols and a second plurality of similar symbols, wherein for some of said valid code words the symbols in the first sub-group are similar to the symbols in the second sub-group and for other valid code words the symbols in the first sub-group are different from the symbols in the second sub-group.

6. A method according to claim 1, wherein said plurality of lines comprise a plurality of parallel lines to constitute a parallel bus.

7. A method of transmitting data comprising:

transmitting a plurality of serial data streams on a corresponding plurality of lines at a common frequency, said data being transmitted in equal groups of symbols; and transmitting on an additional line a framing signal composed of groups of symbols corresponding in number to groups of data symbols;

wherein each group of symbols in the framing signal comprises a majority of symbols capable of representing a first plurality of code words and a second plurality of valid code words, and a minority of symbols which constitute parity check symbols.

\* \* \* \* \*